(12) United States Patent
Skripalle

(10) Patent No.: US 8,714,029 B2
(45) Date of Patent: May 6, 2014

(54) FLOW MEASURING DEVICE AND METHOD INCLUDING BOTH A DOPPLER FREQUENCY SHIFT MEASUREMENT METHOD AND TRAVEL TIME MEASUREMENT METHOD

(75) Inventor: Juergen Skripalle, Germaringen (DE)

(73) Assignee: Hydro Vision GmbH, Kaufbeuren (DE)

( * ) Notice: Subject to any disclaimer, the term of this patent is extended or adjusted under 35 U.S.C. 154(b) by 459 days.

(21) Appl. No.: 13/056,245

(22) PCT Filed: Aug. 4, 2009

(86) PCT No.: PCT/DE2009/001067
§ 371 (c)(1),
(2), (4) Date: Feb. 9, 2011

(87) PCT Pub. No.: WO2010/015234
PCT Pub. Date: Feb. 11, 2010

(65) Prior Publication Data
US 2011/0126636 A1    Jun. 2, 2011

(30) Foreign Application Priority Data
Aug. 4, 2008  (DE) .......................... 10 2008 036 089

(51) Int. Cl.
*G01F 1/66*          (2006.01)

(52) U.S. Cl.
USPC ........................................................ 73/861.27

(58) Field of Classification Search
None
See application file for complete search history.

(56) References Cited

U.S. PATENT DOCUMENTS

| | | | | |
|---|---|---|---|---|
| 6,067,861 A * | 5/2000 | Shekarriz et al. | ........... | 73/861.25 |
| 6,575,043 B1 * | 6/2003 | Huang et al. | ............... | 73/861.25 |
| 7,318,355 B2 * | 1/2008 | Ishikawa | ................... | 73/861.25 |
| 2008/0156107 A1 * | 7/2008 | Ao et al. | ................... | 73/861.27 |
| 2010/0299088 A1 * | 11/2010 | Huang et al. | ............... | 73/861.27 |

FOREIGN PATENT DOCUMENTS

EP         1 719 980 A1    11/2006

* cited by examiner

*Primary Examiner* — Harshad R Patel
(74) *Attorney, Agent, or Firm* — Oliff PLC

(57) ABSTRACT

Provided are a method and a device for determining a flow rate through a pipe. A first measurement device is provided which determines the flow profile of the fluid in a first region using a Doppler frequency shift measurement method, and a second measurement device is provided which determines the flow profile of the fluid in the pipe in a second region using a travel time measurement method.

4 Claims, 4 Drawing Sheets

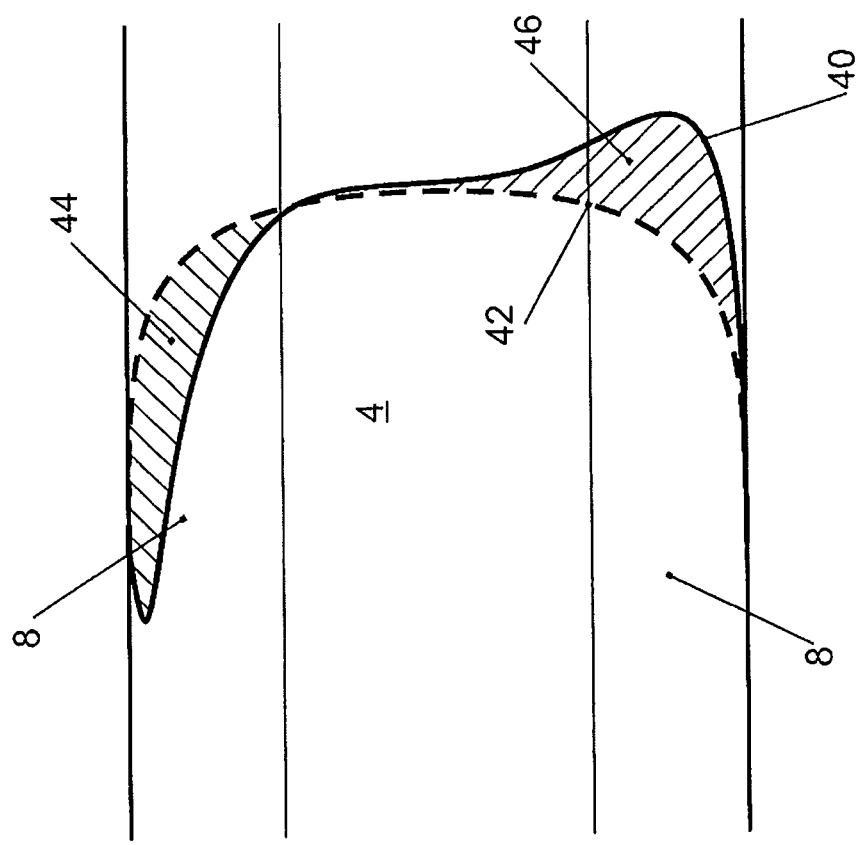

Figure 1:
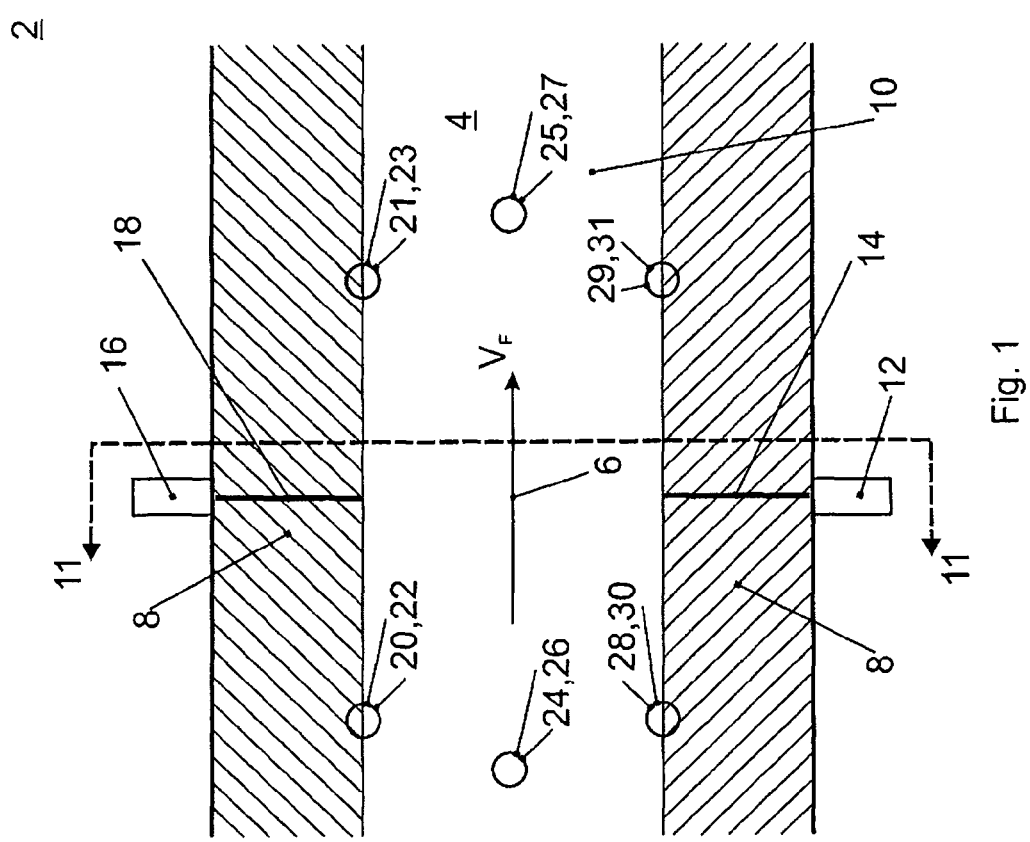

FLOW MEASURING DEVICE AND METHOD INCLUDING BOTH A DOPPLER FREQUENCY SHIFT MEASUREMENT METHOD AND TRAVEL TIME MEASUREMENT METHOD

The present invention relates to a method and a device for determining a flow rate of a fluid, for instance, water or crude oil, through a fluid flow path, in particular a pipe, a closed channel or the like, wherein the flow rate is determined by a measuring device for determining the flow velocity of the fluid by means of the Doppler frequency shift and a measuring device for determining the flow velocity of the fluid by means of the travel time measurement method.

From prior art, clampable or incorporated ultrasonic flow meters are known in which a detector is attached at or in the outer wall of a pipe. The detector sends an ultrasonic wave into a fluid flowing through the pipe and measures the flow velocity of the fluid by means of modification of the ultrasonic wave spreading in the fluid. For calculating the flow velocity of the fluid, the Doppler frequency shift measurement method and/or the travel time measurement method may be used. The detector may also immerse into the fluid as a "wet sensor".

In the case of the Doppler frequency shift measurement method, an ultrasonic pulse is irradiated by a sender receiver detector into the fluid to be measured and a reflected ultrasonic wave is received which is reflected at a foreign body, such as, for instance, an air bubble or a dirt particle, in the fluid. Due to the flow velocity of the fluid, the frequency of the irradiated and the reflected ultrasonic wave is shifted. The velocity of the fluid may be derived from this difference in frequency.

Since the irradiated ultrasonic wave is reflected at a plurality of foreign bodies available at different depths of the pipe, a depth-layered velocity profile of a fluid flowing through a pipe may be measured by means of the Doppler measurement method.

The method, however, has the disadvantage that the fluid has to comprise foreign bodies or particles at which the ultrasonic wave can be reflected. On the other hand, the irradiated ultrasonic wave has to have sufficiently high energy to ensure a sufficient depth of penetration of the ultrasonic wave into the fluid flowing through the pipe.

A method for determining the flow velocity of a fluid in which the travel time of an ultrasonic signal from a sender to a receiver is determined is also known from prior art. Preferably, the sender and the receiver are positioned at opposite sides of the pipe, wherein an angle α of less than 90° has to exist between the irradiated ultrasonic wave and the direction of flow of the fluid. In such an arrangement, the ultrasonic waves sent by the ultrasonic sender to the ultrasonic receiver spread, due to the movement of the fluid, at a velocity that is modified with respect to an immobile fluid. Depending on whether the ultrasonic wave is emitted in the direction of flow or against the direction of flow, the ultrasonic wave received has increased or decreased velocity, wherein the increase or the decrease, respectively, depends on the cosine of the irradiation angle α. The flow velocity of the fluid may be derived from the comparison of the travel times.

Since the flow velocity of the fluid depends on the cosine of the angle α of the irradiation of the ultrasonic wave, the problem that results during travel time measurement is that for sufficiently sensitive measurements the irradiation angle has to be distinctly smaller than 90°. In addition, the ultrasonic sensors may not be positioned at arbitrary proximity to the summit/end of the pipe. On the one hand, it is technically difficult and expensive to produce a bore in this region and, on the other hand, a certain minimum distance to the pipe wall has to be kept due to the spatial extension of the ultrasonic signal so as to avoid reflections. This minimum distance depends on the frequency f and the travel length L of the ultrasonic signal in the fluid and may be determined by the approximate formula $$D_{min} = 27\sqrt{\frac{L}{f}}.$$

If sections in the pipe can be measured only with great difficulties or not at all, assumptions have to be made for the calculation of the flow profile. Such assumptions, however, distort the measurement results and the determination of the flow velocity of the fluid, so that the measuring error is too great when determining flow rates for high-precision applications. High-precision determinations are, for instance, necessary for the exact flow rate of oil or gas through a pipeline.

In order to determine the flow rate more precisely, it was suggested, for instance, in prior art, in particular in EP 1719980, not to determine the flow velocity with the Doppler measurement method or the travel time measurement method alone, but to provide a detector that determines the flow velocity of the fluid both by means of travel time measurement and by means of Doppler shift measurement, wherein the flow rate of the fluid is determined from both measurement results. This means in other words that the results of the one measurement are compared to the results of the other measurement and are correlated, so that the error rate is reduced.

This method indeed improves the exactness of the calculation of the flow velocity, but at border regions of the pipe wall it is still necessary to make assumptions about the flow velocities to be expected there, so that an exact determination of the flow rate of a fluid through a pipe is not possible with this combined method, either.

It is therefore an object of the present invention to provide a method and a device by means of which an exact determination of the flow rate of a fluid through a pipe is possible.

This object is solved by the method and the device as described herein.

The present invention is based on the idea of composing the flow rate of a first and a second flow velocity profile, wherein the first flow velocity profile is determined in a first region of the pipe by means of a first measurement device based on the Doppler measurement method, and the second flow velocity profile is determined in a second region of the pipe differing from the first region by means of a second measurement device based on the travel time measurement method. Both flow velocity profiles are composed to a combined total flow velocity profile which then serves as a basis of the flow rate determination.

It is particularly advantageous if, as is shown by a first preferred embodiment, the region of the flow profile determined with the Doppler measurement method is a region close to the pipe wall, whereas the region measured with the travel measurement method is positioned in the middle of the pipe. This has the advantage that, on the one hand, the irradiated ultrasonic signal need not have a large depth of penetration for the Doppler measurement, but is exclusively oriented to a region close to the wall, so that most exact information about the region of the pipe wall proximity which is difficult to measure with respect to flow profile technology may be achieved with the high-precision Doppler measurement method.

In addition, there is the advantage that interfering elements such as air bubbles or scattered particles at which the ultrasonic measurement signal may reflect are more frequently available exactly in the proximity of the pipe wall.

The flow velocity of the fluid in a pipe middle region of the pipe is determined metrologically by means of the travel time measurement method. This has the advantage that a robust measurement method that is independent of interfering particles is provided for a majority of the region, so that the pipe middle region is easy to measure.

Due to the combination that the region close to the wall is examined by means of the Doppler measurement method, whereas the pipe middle region is determined by means of the travel time measurement method, the advantages of both methods are combined, so that a particularly exact measurement of the flow velocity profile and hence of the flow rate is possible. By means of the method according to the invention it is possible to determine the flow rate of a fluid through a pipe with error rates of less than one percent, in particular in the range of tenths of percent and less.

As is shown by another preferred embodiment, the ultrasonic sender and receiver for the Doppler measurement are positioned in the bottom region of the pipe, whereas the detectors for the travel time measurement are arranged around the pipe middle region. Preferably, the irradiation angle of the ultrasonic measurement signals has an advantageous angle of 45° to the direction of flow of the fluid in the pipe.

In one embodiment, the ultrasonic senders/receivers are positioned at one side of the pipe and the ultrasonic signal is reflected at the opposite wall. It is, however, also possible to arrange the ultrasonic senders/receivers face-to-face.

In another advantageous embodiment the ultrasonic senders/receivers are arranged such that it is not only possible to determine the fluid velocity rate, but also the direction of the fluid flow. To this end, the sensors may be arranged around the pipe in V- or X-shape.

In the case of the V-path measurement arrangement, the ultrasonic sender and receiver are arranged relative to each other at or in the outer wall of the pipe such that a signal emitted by the ultrasonic signal sender is irradiated into the fluid. The performance of the sender is chosen such that the ultrasonic signal radiates to the opposite wall and is reflected there. The reflected portion again passes through the fluid and is caught by the receiver and transmitted to an evaluation unit.

Different from that are the X-path measurement arrangement and the 1-path measurement arrangement in which it is not the ultrasonic signal that is reflected at or in the pipe wall that is detected, but the ultrasonic signal that arrives at the side opposite to the sender. The difference between X-path and 1-path merely consists in that two sender-receiver pairs are provided with the X-path which measure simultaneously in and against the direction of flow, and that it is thus possible not only to determine the fluid velocity rate, but also the vector of the fluid flow as a norm and direction.

Also advantageous is an embodiment in which a further Doppler frequency shift measurement device is positioned in an upper region of the pipe.

The ultrasonic senders/receivers for measuring the pipe middle region and/or the region close to the pipe may be distributed and oriented in a plurality of relative positions at the pipe. In accordance with the invention it is, however, preferred if the ultrasonic signal sent by the travel time detectors runs at an angle of approximately 45° to the direction of flow.

The relative positioning of the detectors for travel time measurement and for Doppler measurement may be varied relatively arbitrarily, but in accordance with the invention these detectors are arranged at an angular distance of approximately 90° between the travel time detector and the Doppler detector. Of course, other angular positions are also possible.

In principle, a mixture of the afore-described concepts (V-path, 1-path, and X-path) is also possible with the travel time detectors.

Further advantages and advantageous embodiments are defined in the subclaims, the Figures, and the description.

In the following, the invention will be described in detail by means of the embodiments illustrated in the Figures. The embodiments are of a purely exemplary nature and are not to be used to restrict the scope of the claims thereto, wherein the scope of the patent application is defined alone by the enclosed claims. There show:

FIG. 1: a schematic longitudinal section of a pipe at which a device according to the invention is positioned pursuant to a first embodiment.

Figure 2:
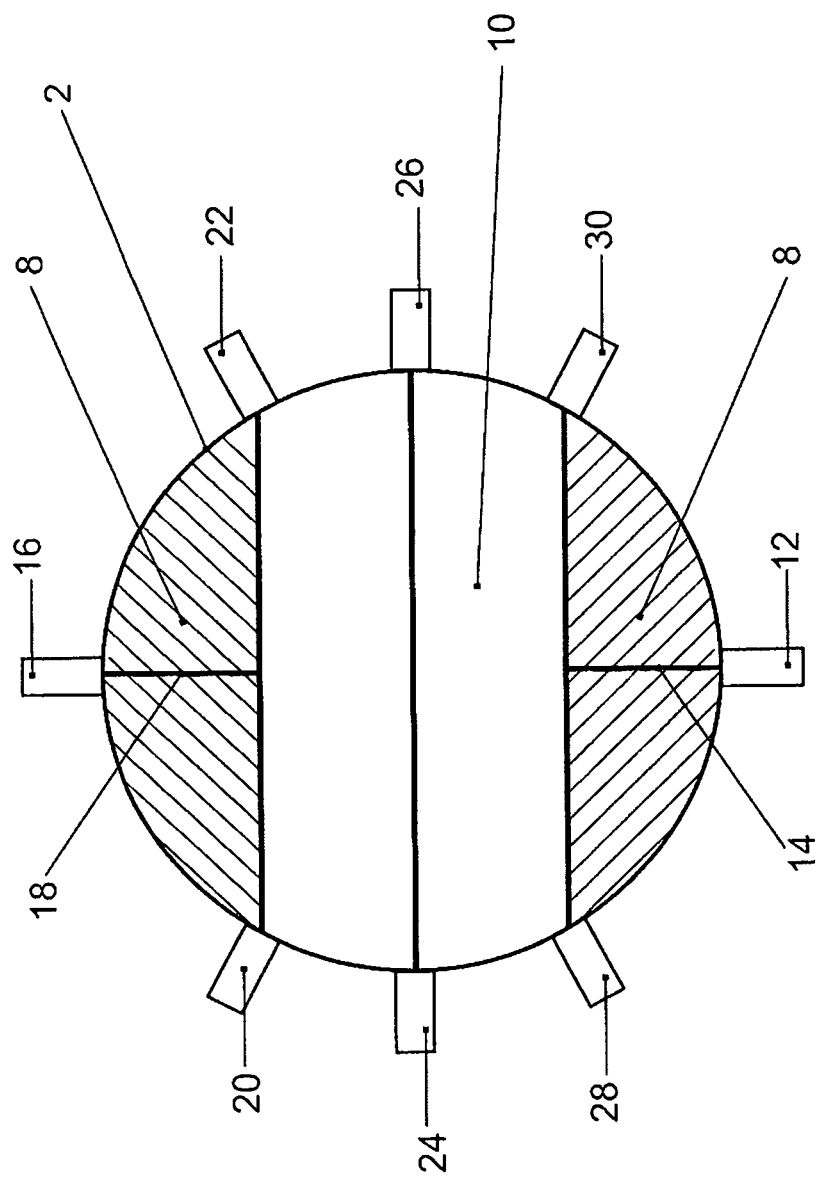
Figure 3:
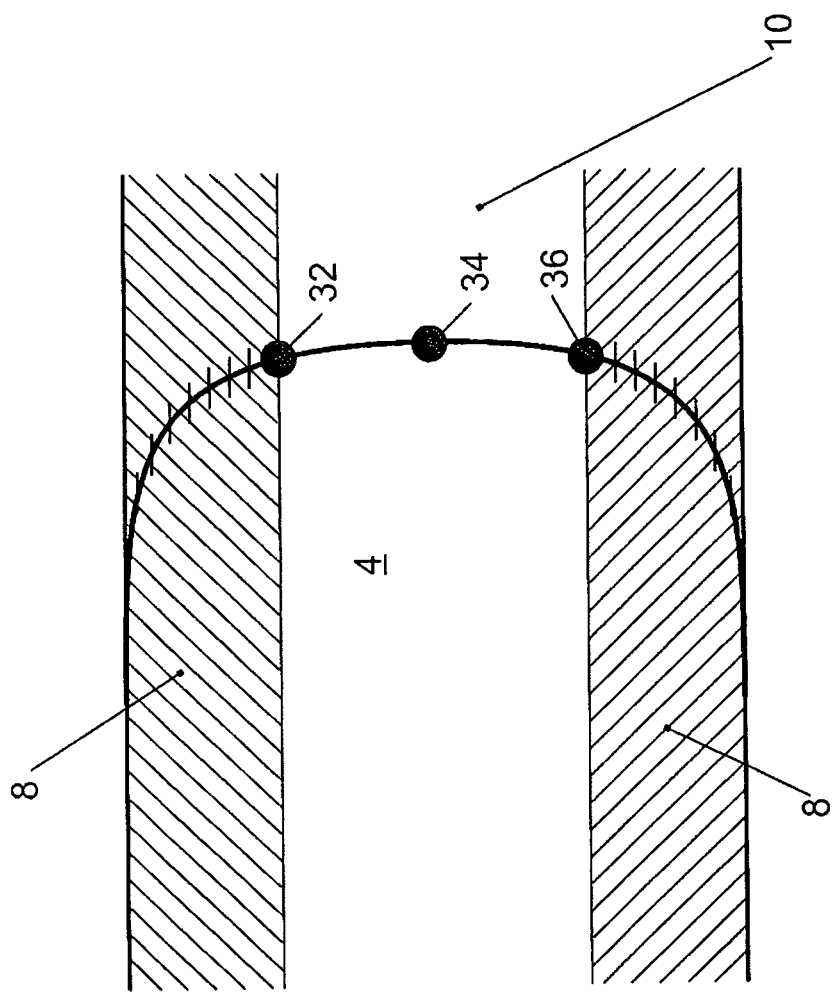

FIG. 2: a schematic cross section illustration through the pipe of FIG. 1;

FIG. 3: a schematic illustration of a flow velocity profile to be measured, comprising schematic measuring points in accordance with a preferred embodiment of the present invention; and FIG. 4: a comparative schematic illustration between an approximated flow velocity profile and a flow profile measured in the manner according to the invention of a flow behind a pipe wall.

FIG. 1 shows a longitudinal section of a pipe 2 in which a fluid 4 flows in flow direction 6 at a rate $V_F$. The pipe 2 comprises a first region 8 close to the pipe wall and a second region 10 in the middle of the pipe. At an outer side of the pipe, a plurality of measurement instruments 12, 16, 20 to 31 are arranged, wherein the—in FIG. 1—middle measurement instruments 12, 16 are arranged approximately in a first cross section plane of the pipe 2, the left measurement instruments 20, 22, 24, 26, 28, 30 approximately in the region of a second cross section plane, and the right measurement instruments 21, 23, 25, 27, 29, 31 approximately in the region of a third cross section plane.

FIG. 2 shows a section along the plane 11 with a view against the flow direction 6. From this view, the relative positioning of the detectors explained in the following will be recognized better. In accordance with FIGS. 1 and 2 measurement instruments 12, 16, 20 to 31 are provided in the illustrated embodiment—as described above—at the outer side of the pipe, said measurement instrument determining the flow velocity profile of the fluid 4 by means of ultrasound. In accordance with the illustrated embodiment, an ultrasonic converter 12 is provided for detecting the velocity in the first region 8 that has the shape of the segment of a circle and is close to the pipe wall, said ultrasonic converter 12 irradiating an ultrasonic signal 14 into the region 8 close to the pipe wall and determining the flow velocities in different irradiation depths by means of the Doppler frequency shift between the irradiated and the reflected signals.

Optionally, another ultrasonic converter 16 with a sender and a receiver may be positioned in an upper region of the pipe, said ultrasonic converter 16 also operating pursuant to the Doppler principle and determining the flow velocity profile of the fluid 4 in the upper region of the pipe by the ultrasonic signal 18.

In order to determine the flow velocity profile in the middle region 10 of the pipe 2, ultrasonic converters 20, 22, 24, 26, 28, 30 and 21, 23, 25, 27, 29, 31 of FIG. 1 are further arranged at the outer wall of the pipe which determine the velocity profile by means of the travel time measurement method. The ultrasonic converters 20-31 may not only be arranged like in the illustrated X-path measurement arrangement, but also as a V-path or a 1-path measurement arrangement. In principle, it is thus possible, in order to increase the measurement accuracy, to detect the velocity in several planes 1-n, as illustrated exemplarily in FIG. 1, of the middle region 10 by a suitable arrangement of the detectors (ultrasonic converters). The ultrasonic converters 20-31 may be designed as senders and receivers for ultrasonic waves, wherein the ultrasonic converters 20-31 are arranged such that the ultrasound emitted by them defines an angle α to the flow direction 6 of the fluid 4. The angle α should preferably be chosen distinctly smaller than 90° so as to achieve as good measurement results as possible. Particularly preferred is an irradiation angle of approximately 45° with respect to the flow direction of the fluid.

For instance, the—in FIGS. 1 and 2—left upper ultrasonic converter 20 sends an ultrasonic wave that is received by the—in FIG. 1—right upper ultrasonic converter 21 that is positioned in FIG. 2, when viewed perpendicularly to the drawing plane, behind the ultrasonic converter 22. And the—in FIG. 2—upper and right ultrasonic converter 22 sends an ultrasonic wave to the ultrasonic converter 23 that is positioned at the right top in FIG. 1 and behind the ultrasonic converter 20 in FIG. 2. Thus, a form of the X-path measurement arrangement would be available. Correspondingly, the ultrasonic converters 24, 26 are used with the ultrasonic converters 25, 27, and the ultrasonic converters 28, 30 are used with the ultrasonic converters 29, 31.

By means of the ultrasonic converter 20-31, the flow velocity profile in the middle region 10 of the fluid 4 flowing through the pipe may then be determined by a travel time measurement.

FIG. 3 schematically illustrates an exemplary flow velocity profile of a fluid 4 flowing through a pipe, wherein ideal conditions are assumed, i.e. there are no upstream curves, branches, etc. and no pollution exists. Due to the friction at the pipe wall, the flow velocity of the fluid 4 is decelerated in the region 8 close to the pipe, whereas a relatively uniform flow velocity distribution exists in the pipe middle region 10. While the flow velocity profile in the middle region 10 can be approximated well via three measuring points 32, 34, and 36 by the measurement in three planes, this is not possible with conventional solutions in the flow profile region 8. Due to the examination of these flow profile regions 8 in accordance with the invention by means of the Doppler measurement method it is possible to sense this region in a very sensitive manner, so that the exact profile region progress in this region can be determined. The depth-layered measurement is indicated by dashes.

The exact profile progress in the border region is of particular interest if the flow velocity profile has no ideal form, as illustrated in FIG. 3, but is influenced by interferences, for instance, curves, branches, throttle elements, or the like. In this case, it is exactly the border regions of the flow profile that are strongly modified, so that a great measuring error in the calculation of the flow rate may occur due to the modified flow profile.

FIG. 4 exemplarily shows a distorted flow velocity profile 40. Compared to the idealized, approximately parabolic flow velocity profile 42 (dashed in FIG. 4) of FIG. 3, the real flow velocity profile 40 comprises great deviations in particular in the border regions 8, so that a flow rate obtained due to the inaccurate assumed velocity profile is unacceptably inexact. The deviating regions 44, 46 that may result in an incorrect calculation of the flow rate are hatched in FIG. 4. The afore-described deviations from the ideal form may, for instance, be caused by curves of the pipe 2 above the measurement cross section.

With the previous measurement methods it has not been possible to detect such velocity profiles. If, however, the flow profile in the border region 8 is examined by means of the ultrasonic Doppler detectors, it is possible to detect the exact flow velocity profile and to determine the flow rate exactly. As mentioned before, by means of the ultrasonic Doppler detectors it is also possible to detect the flow velocity in several planes of the border region, so that, in particular in combination with the detectors for travel time measurement which measure in several planes n, an extremely exact velocity profile can be measured which is then evaluated by using evaluation algorithms, so that very exact conclusions on the actual flow behavior in the measured pipe are possible.

The embodiment according to the invention has been explained by means of a circular pipe. As a matter of fact, the invention may also be transferred to other pipe geometries, for instance, elliptic pipes, rectangular pipe sections, or other pipe sections having a closed cross section. Deviating from the afore-described embodiment, the ultrasonic Doppler detectors 12, 16 may also be arranged at several measurement regions distributed at the circumference, so that a circumferential velocity profile can be detected. The same applies, of course, also to the detectors for travel time measurement, the arrangement of which may be selected such that practically any arbitrary point in the middle region 10 of the cross section plane 11 can be detected.

As mentioned initially, it is possible to detect the flow profile of different fluids, for instance, potable water, process water, crude oil in pipelines, etc. by means of the measurement method according to the invention. Pilot tests have shown that a very substantially improved exactness with respect to the measured velocity profile can be achieved with the method according to the invention, so that partially a new calibration of the measurement devices that are commonly used in the above-mentioned cases of application becomes necessary.

With respect to the instant invention it has to be noted in particular that the Doppler measurement method and the travel time measurement method are not each used for the entire region of the pipe, but that selectively the border region is examined with the Doppler method, whereas the flow profile in the middle region is examined with the travel time method. The total flow velocity profile is then composed of the two flow velocities.

Disclosed are a method and a device for determining a flow rate through a pipe, wherein a first measurement device is provided which determines the flow profile of the fluid in a first region by means of a Doppler frequency shift, and a second measurement device is provided which determines the flow profile of the fluid in the pipe in a second region by means of a travel time measurement method.

List of Reference Signs

2 pipe
4 fluid
6 flow direction
8 region close to the pipe wall
10 pipe middle region
11 cross section plane 12 ultrasonic converter (Doppler)
14 ultrasonic signal (Doppler)
16 ultrasonic converter (Doppler)
18 ultrasonic signal (Doppler)
20 measurement instrument/ultrasonic converter (travel time)
21 measurement instrument/ultrasonic converter (travel time)
22 measurement instrument/ultrasonic converter (travel time)
23 measurement instrument/ultrasonic converter (travel time)
24 measurement instrument/ultrasonic converter (travel time)
25 measurement instrument/ultrasonic converter (travel time)
26 measurement instrument/ultrasonic converter (travel time)
27 measurement instrument/ultrasonic converter (travel time)
28 measurement instrument/ultrasonic converter (travel time)
29 measurement instrument/ultrasonic converter (travel time)
30 measurement instrument/ultrasonic converter (travel time)
32 measuring point
34 measuring point
36 measuring point
40 flow velocity profile
42 flow velocity profile
44 deviating region
46 deviating region

The invention claimed is:

1. A method for determining a flow rate of a fluid through a pipe, wherein first measurement devices are provided which determines a first flow velocity profile of the fluid by means of a Doppler frequency shift, and second measurement devices are provided which determines a second flow velocity profile of the fluid in the pipe by means of a travel time measurement method, comprising the steps of:
   determining the first flow velocity profile in a first region of said pipe by means of said first measurement devices;
   determining the second flow velocity profile in a second region of said pipe by means of said second measurement devices; and
   combining said first and second flow velocity profiles to a total flow velocity profile from which the flow rate of the fluid through the pipe is calculated,
   wherein the first region of the pipe is a border region and the second region of the pipe is a middle region in a cross section plane of the pipe,
   wherein at least two first measurement devices are arranged diametrically face-to-face or laterally displaced in a bottom region and an upper region in a cross section plane of said pipe, and
   wherein the second measurement devices are arranged in said middle region between said bottom and upper region, such that velocity is detectable in several planes.

2. The method according to claim 1, wherein said second measurement devices are arranged around said pipe in V-path arrangement, X-path arrangement, or 1-path arrangement.

3. A device for determining a flow rate of a fluid through a pipe, comprising first measurement units, for determining a Doppler frequency shift of an ultrasonic signal irradiated into the fluid, and second measurement units for determining a flow velocity of the fluid by means of a travel time difference of an ultrasonic signal irradiated into the fluid, wherein said first measurement units are arranged such that the velocity of the fluid can be determined in a first region, said second measurement units are arranged such that the flow velocity of the fluid is determinable in a second measurement region, and
   an evaluation unit is provided which is adapted to determine a first flow velocity profile of the first region from the measurement values of said first measurement units and a second flow velocity profile of the second region from the measurement values of said second measurement units, and to combine the first and the second flow velocity profiles to a total flow velocity profile,
   wherein the first region of said pipe is a border region of the pipe and/or the second region of the pipe is a middle region of the pipe,
   wherein at least two first measurement units are arranged diametrically face-to-face or laterally displaced in a bottom region and an upper region in a cross section plane of said pipe, and
   wherein the second measurement units are arranged in said middle region between said bottom and upper region of said pipe, such that velocity can be sensed in several planes.

4. The device according to claim 3, wherein said second measurement units are arranged around said pipe in V-path arrangement, X-path arrangement, or 1-path arrangement.

* * * * *